Jan. 9, 1962   C. R. WOODRUFF   3,016,099
HOLE ENLARGER
Filed July 17, 1959   2 Sheets-Sheet 1
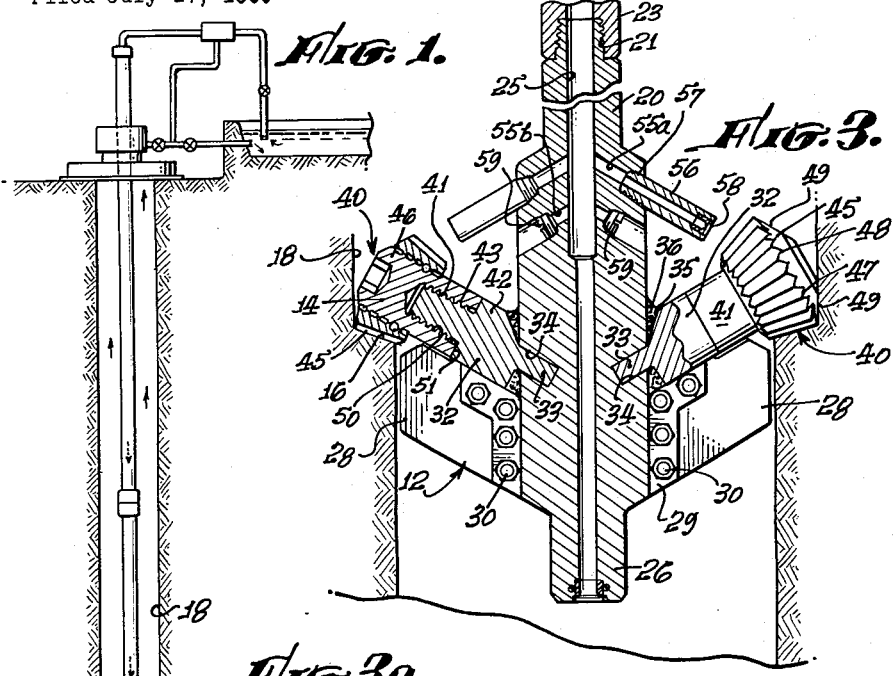
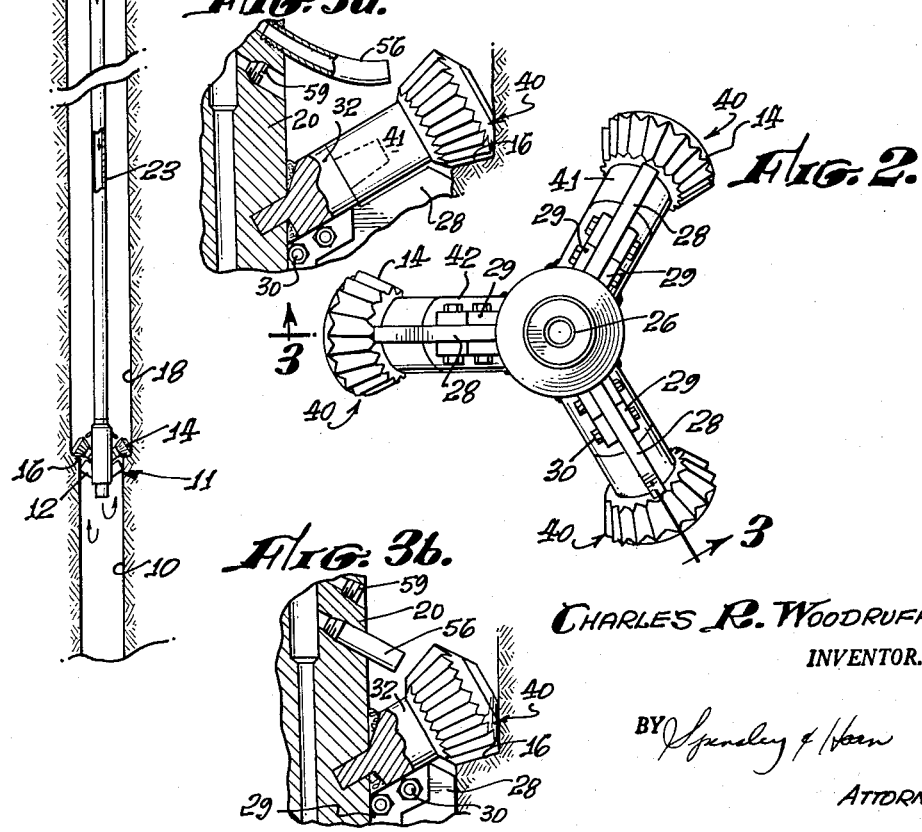
CHARLES R. WOODRUFF,
INVENTOR.
BY Spendley & Hearn
ATTORNEYS.

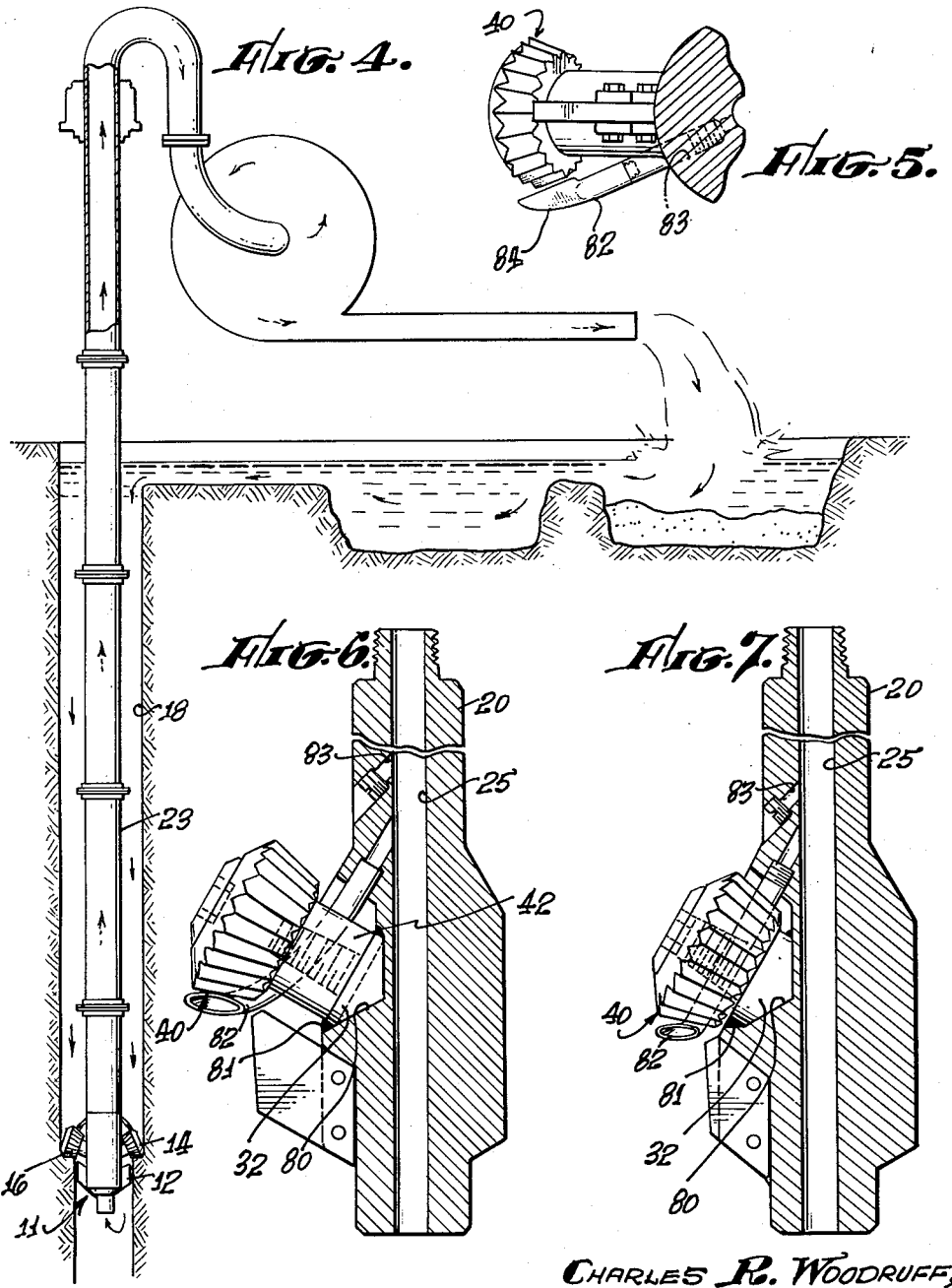

United States Patent Office 3,016,099
Patented Jan. 9, 1962

3,016,099
HOLE ENLARGER
Charles Robert Woodruff, Long Beach, Calif., assignor of fifty percent to Terminal Drilling and Production Co., Wilmington, Calif., a corporation of California
Filed July 17, 1959, Ser. No. 827,759
4 Claims. (Cl. 175—344)

This invention relates to earth boring apparatus and more particularly to an improved earth boring apparatus for boring holes of large diameter into the earth.

The drilling of holes of large diameter by the rotary drilling method is becoming increasingly important and the depth to which such holes are drilled has also increased. Large holes having diameters up to several feet have been drilled heretofore by the rotary drilling method, however, most of such holes have been shallow and the tools used for the purpose have been unsatisfactory for deep drilling and have entailed considerable expense. That is, prior to the present invention the practice in drilling holes of large diameter has been to drill a smaller hole termed a pilot hole, after which an enlarger of a specified diameter is used to enlarge the pilot hole to the required diameter. A particular disadvantage of such prior art apparatus is due to the fact that the hole enlarger used to increase the diameter of the hole to the required size is of a fixed size and is extremely expensive to manufacture. That is, by prior art apparatus, if the diameter of the hole which has been drilled is to be enlarged to three feet, for example, a series of hole enlargers of increasing diameter are used until a diameter of three feet is reached. If it then becomes necessary to increase or decrease the diameter of the hole at a particular depth, or if for any reason the three-foot hole is to be enlarged to four feet, for example, it is necessary to substitute a complete apparatus having a cutting diameter of four feet. Due to the size of such tools, the tool body and cutters are extremely expensive, both in manufacture and due to the materials used.

Accordingly, it is an object of the present invention to provide an improved hole enlarger which can be adapted to large diameter drill holes of various diameters.

It is another object of the present invention to provide a hole enlarging apparatus in which the cutters of the apparatus are replaceable with cutters of a different cutting diameter.

It is another object of the present invention to provide such a hole enlarging apparatus in which the cutters are easily and quickly replaceable in the field.

It is another object of the present invention to provide such a hole enlarging apparatus having replaceable cutters which can be replaced without cutting of the tool or welding.

A further object of the present invention is to provide a hole enlarging apparatus which allows efficient circulation during drilling.

A still further object of the present invention is to provide such a hole enlarging apparatus which allows efficient circulation during the drilling of a hole by means of reverse circulation.

The present invention is a hole enlarger for the rotary drilling of holes of large diameter comprising an elongate tool body having a longitudinal circulation opening therethrough, to which are affixed at circumferentially spaced intervals a plurality of radially extending cutter assembly affixing members. The affixing members are threaded at the outer end thereof. A cutter is rotatably mounted upon a shaft of predetermined length and the shaft is threadably mated with and removably affixed to the threads at the end of each of the cutter assembly affixing pins. A circulation jet is affixed to the tool body above each of the cutters directed toward the respective cutter with a fluid outlet through the body and the jet communicating with the longitudinal opening through the body.

The novel features which are believed to be characteristic of the present invention, both as to its organization and method of operation, together with further objects and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

In the drawings:

FIGURE 1 is a partially schematic view of a presently preferred embodiment of a hole enlarger in accordance with the present invention as used in a rotary drilling operation utilizing conventional forward fluid circulation;

FIGURE 2 is a bottom plan view of the hole enlarger as utilized in FIGURE 1;

FIGURE 3 is a view partly in section taken along line 3—3 of FIGURE 2 showing the presently preferred embodiment of FIGURES 1 and 2;

FIGURE 3a is a cutter assembly for increased diameter relative to FIGURE 3;

FIGURE 3b is a cutter assembly for decreased diameters relative to FIGURE 3;

FIGURE 4 is a partially schematic view showing the use of a second embodiment of the present invention as utilized in a drilling operation using reverse fluid circulation;

FIGURE 5 is an enlarged partial view showing a single cutter with a circulation jet in accordance with the present invention for reverse circulation;

FIGURE 6 is a view of the second embodiment corresponding to FIGURE 5 and having substituted therefor a cutter adapted to enlarge the pilot hole to a lesser diameter than the cutter shown at FIGURE 5; and FIGURE 7 is a view corresponding to FIGURE 6 showing a cutter of still less diameter mounted upon the hole enlarger body.

Referring now to the drawings, there is shown in FIGURES 1 through 3 a presently preferred embodiment of the present invention as used to enlarge a pilot hole of one diameter to a finished hole of the desired diameter by a rotary drilling operation using conventional forward fluid circulation. As shown in FIGURE 1, in the standard method of use the pilot hole 10 has been previously drilled to a first diameter. The hole enlarger 11 in accordance with the present invention is affixed at the end of a drill string with a pilot bit 12 having a diameter substantially equal to but less than the pilot hole diameter following the pilot hole downward as the cutters 14 upon the hole enlarger cut the annular shoulder 16 to enlarge the hole to the required diameter 18. Circulation in this type of drilling operation is such that drilling fluid is pumped downward through the drill string and through a longitudinal opening in the hole enlarger body into the pilot hole and thence upward around the hole enlarger and drill stem to the surface and outward to a sump. In moving downward through the drill stream a portion of the circulating fluid is taken off by fluid jets affixed to the hole enlarger as described hereinafter for cleaning the surface of the cutters and removing cuttings from the vicinity thereof.

Referring now particularly to FIGURES 2 and 3, the hole enlarger 11 in accordance with the present invention comprises the tool body 20 which is an elongate cylindrical body having an upper threaded end 21 which is mateable with the threads of the drill string 23. A longitudinal fluid flow path 25 extends throughout the length of the body to act as a fluid path for the circulating fluid flowing downward through the drill string. Proximate the lower end 26 of the tool body 20 a pilot bit is formed having an outside diameter substantially equal to the diameter of the pilot hole 10 such that the tool will follow the hole and remain in proper position within the hole. Although many types of pilot bits can be used the bit shown in connection with the presently preferred embodiment comprises three pilot bit blades 28 circumferentially spaced at equal intervals around the periphery of the tool body 20 and radially extending therefrom to the diameter of the pilot hole. The blades 28 are thus metal plates which are affixed to the tool body 20 at an angle with the horizontal in order to more readily guide the tool through any material which may collect in the hole. Each of the blades are affixed to the tool body in the embodiment shown by means of affixing brackets 29 which are permanently welded to the body and spaced apart by a thickness substantially equal to the thickness of the pilot bit blade 28.

Thus, in order that the blades 28 can be removably mounted on the body 20, three brackets 29 are affixed to the body, each of the brackets comprising two spaced apart plates which are generally inverted L-shaped in configuration. Holes are drilled through the brackets 29 and mating holes are drilled through the blade 28 such that the blade can be inserted between the brackets 29 and fastened thereto by means of bolts 30. Thus, in order to change the size of the pilot bit, it is necessary only to remove the bolts 30 and insert between the brackets a blade 28 having a length which is proper to extend the blade 28 radially to the desired diameter which conforms to the diameter of the pilot hole. In the embodiment shown, three such pilot bit blades 28 are utilized although this number may be varied, and as discussed above, many other types of pilot bits can also be used. For example, a pilot bit formed from a section of casing having an outside diameter equal to the inside diameter of the drill hole and mounted upon the body by means of a spider can also be used, it being the function of the pilot bit to guide the hole enlarger downward through the pilot hole.

Positioned above the pilot blades 28 are a plurality of cutter assembly affixing members 32, each of which is similar in configuration and affixed to the tool body in a similar manner. In the embodiment shown, three such cutter assemblies and cutter affixing members are mounted upon the body. Each of the cutter assembly affixing members 32 in the embodiment shown comprises a pin of substantial diameter which is formed with an extension 33 of lesser diameter at one end thereof. The extension 33 is mateable with an opening 34 in the tool body such that the member 32 can be extended into the bodies of larger size for strength in mounting. Adjacent the extension 33 the body of the member 32 is tapered as at 35 to provide fillets which extend outwardly from the body. These fillets provide a circumferential groove or opening surrounding the member 32 between the member and the periphery of the tool body 20 in order that considerable weld metal 36 can be placed between the member 32 and the body for strength in mounting.

As shown particularly in FIGURE 3, the opening 34 in the body into which the extension 33 extends and the upper surface of the pilot bit mounting bracket 29 are extended at a common angle, which angle is determined by the angle at which it is desired to mount the cutters with respect to the longitudinal axis of the hole enlarger. Thus, each of the cutter assembly affixing members 32 extends radially outward and upward with respect to the tool body when the tool body is vertically oriented as shown in FIGURE 3. The angle at which the member 32 extends upward is predetermined as discussed hereinafter by the angle of the cutter blade 40. At the outer end of each affixing member 32 a shank 41 is formed having a diameter lesser than the diameter of the main portion 42 of the assembly affixing member 32. Thus, a transverse shoulder 43 is formed on the body of the member 32 and the shank 41 extends radially outward therefrom along the longitudinal axis of the member 32. The shank 41 is male threaded and forms the threaded member which is mateable with the cutter assembly. The pilot bit mounting bracket 29 can also be welded to the assembly member 32 for additional strength.

A cutter assembly 40 is removably affixed to each of the affixing members 32. Each of the cutter assemblies are similar in construction and configuration and comprise a cutter 45 and a mounting shaft 46. The cutters shown in the embodiment of FIGURES 1 through 3 are of the conventional type with a series of indentations 47 forming a number of teeth or cutting surfaces in a frusto-conical surface 48. An inverted frusto-conical section 49 extends outwardly from the cutting surface 48. The cutting surface 48 is such that it will cut through the annular shoulder 16 with a rolling motion as the hole enlarger is rotated within the hole. Thus, each of the cutters 45 is rotatably mounted upon the mounting shaft 46. The mounting shaft 46 has a diameter substantially equal to the diameter of the main portion 42 of the affixing members 32 and is formed with a female threaded opening 50 which is threadably mateable with the threaded shank 41 of the affixing member 32. The cutter assemblies are mounted upon the affixing member 32 by threading the shaft 46 onto the male threaded portion 41 until the shoulder 51 of the shaft 46 abuts the shoulder 43 of the affixing member 42. The angle at which the affixing member 32 and cutter assemblies 40 are extended from the tool body 20 is such that the frusto-conical cutting surface 48 of the cutters 45 is inclined inwardly and downwardly from the outside diameter at an angle, for example between 15°–22° with respect to the vertically oriented hole in order that it will cut or mill away the shoulder 16. It should be noted that the threaded engagement between the shaft 46 and shank 45 is such that rotation of the tool during the cutting operation will tighten the cutter assembly upon the affixing member.

Positioned above the cutter assemblies with respect to the vertical orientation of the tool body as shown in FIGURE 3, are a plurality of fluid openings 55 which are circumferentially spaced at intervals equal to the circumferential spacing of the cutter assemblies 40. That is, the openings lie substantially in the same radial plane as the center line of the cutter assemblies. The fluid openings 55 are directed radially outwardly and downwardly toward the cutter assemblies and communicate with the longitudinal opening 25 through the tool body 20. The fluid openings 55 are female threaded such that they are mateable with a male threaded fluid jet 56 which is a tubular member having a male threaded end 57 mateable with the female threads in the fluid path 55. Thus, the fluid jets 56 are threaded into the fluid openings 55 and extend radially outward therefrom at a downward angle with respect to the horizontal. The angle at which the fluid openings 55 and jets 56 occur are such that the outer end 58 of the jet is proximate to and directed toward the cutting surface 48 of the cutting assembly 40. That is, the spacing by which the fluid jets 56 are positioned above the cutter assemblies, together with the angle at which the jets are inclined to the horizontal, positions the end of the jet 58 at the location described. The number of jets is equal to the number of cutters with each jet being positioned toward and proximate to its respective cutter. As shown in FIGURE 3, a plurality of fluid paths 55 are provided in the tool body such that more than one fluid path corresponds to each of the cutter assembly positions. In the embodiment shown, two such sets of fluid openings 55a and 55b are provided in each radial plane of the cutter. The fluid paths which are not utilized for any given cutter assembly are plugged by means of plugs 59 as shown. The utility of a plurality of fluid jet positions for each cutter position will be more apparent in connection with the description of operation of the present invention.

Thus, in operation, the presently preferred embodiment of the invention as shown in FIGURES 1 through 3 is mounted upon a drill string 23 by means of the threaded tool body 20 which is threaded at its upper end 21. The cutter assemblies 40 which are mounted upon the body are of a predetermined diameter such that the hole is enlarged from the diameter of the pilot hole 10 to the increased diameter of the hole 18. As circulation builds up in the drilling operation, fluid flows downward through the drill string and through the longitudinal opening 25 through the drill body. As the drill string and hole enlarger are rotated, fluid passes outward through each of the fluid paths 55a and through the fluid jets 56 to present a stream of fluid at the face of the cutter to remove cuttings therefrom and to insure a clean cutting area at the shoulder 16. The fluid then passes outward from the tool body and downward into the pilot hole 10. The fluid picks up any cuttings or loose materials and flushes them upward past the cutters and along the exterior of the drill string between the drill string and the hole 18 as shown by the arrows in FIGURE 1. If it is then necessary to enlarge the diameter of the hole beyond the diameter 18, it is necessary only to remove the cutter assemblies 40 by threading the shaft 46 off of the affixing member 32. To enlarge the hole beyond the diameter 18, a new set of cutter assemblies are installed in which the shaft 46 is of greater length than that shown in FIGURES 2 and 3. That is, the tool body and affixing members are again used and the only change in the tool is made by changing the cutter assemblies and, if necessary, the fluid jets 56.

To obtain an increased diameter beyond that of the hole 18 the cutter assemblies will have a longer shaft and the cutting face of the cutters will also be of increased extent, as shown in FIGURE 3a, if the shoulder 16 to be cut away is greater than that shown in FIGURE 3. If the diameter to which the hole is to be enlarged is less than that of FIGURE 3 a cutter as shown in FIGURE 3b is used. If the pilot hole is also of a different diameter and the pilot bit can be increased or decreased by removing the bolts 30 and replacing the bits 28 with blades of the necessary length to form a pilot bit of the correct diameter to guide the hole enlarger into the pilot hole 10. When the cutter assemblies 40 are altered it may also be necessary to alter the fluid jets 56 since it is preferable to have the jets proximate to and directed at the cutting face 48 of the cutters 40. Thus, it can be seen that if a cutter having a lesser diameter than that shown in FIGURE 3 is used, the jets 56 are removed from the tool body 20 and the fluid paths 55a are plugged. The jets are then moved into the fluid openings 55b which have been unplugged such that the jets are at a lesser diameter than previously. The length of the jets can, of course, be altered in accordance with the diameter of the cutters being used. In addition, the circulation system through the nozzles 56 can be altered in any desired manner by utilizing jets which are of different lengths or are curved to place the fluid outlet on a desired position. The fluid velocity through the nozzles can also be altered by varying the diameter of the nozzles or jets 56.

The presently preferred embodiment of a hole enlarger in accordance with this invention having a cutter with a diameter decreased from that of FIGURE 3, is shown in FIGURE 3b while a cutter of increased diameter is shown in FIGURE 3a.

Referring now to FIGURES 4 through 7 an alternative embodiment of the present invention as utilized in a drilling operation using reverse flow circulation is shown. In FIGURE 4 an illustrative reverse circulation drilling operation is shown. Reverse circulation drilling is a well-known art and is particularly useful in the drilling of large diameter holes since it is difficult to obtain sufficient circulation velocity to lift the cuttings by the conventional forward circulation method. In enlarging large diameter holes, for example 46 inches and greater, reverse circulation is virtually essential in order to obtain sufficient upward velocity of the drilling fluid to carry the cuttings upward. In reverse circulation the fluid is directed downward through the annular space between the drill string and the inside wall of the hole. As the fluid reaches the bottom of the hole under pressure or gravity it is forced or sucked upward through the drill string, kelly, swivel, etc. into a ditch, shaker system or sump where the cuttings are collected and the fluid is then recirculated back into the hole surrounding the drill string. Reverse circulation thus allows a greater circulation and high velocity upward movement of the fluid when the hole is of large diameter.

The hole enlarger in the embodiment shown in FIGURES 4 through 7 is in most respects similar to that shown and previously described in connection with FIGURES 1 through 3. That is, a plurality of affixing members 32 are extended radially outwardly and upwardly from the tool body and have a male threaded shank at the radially outer end thereof. Cutters for various diameters are affixed to the male threaded affixing member and different diameters of the hole are obtained by increasing or decreasing the length of the shaft 46 upon which the cutters are rotatably mounted. In this embodiment, however, which is particularly adapted to reverse circulation drilling, the opening 25 through the tool body is of necessity of greater diameter than that shown in connection with a hole enlarger used in forward circulation drilling. Accordingly, the means by which the affixing member 32 is affixed to the tool body is varied slightly in that it is not possible to extend the affixing member as far into the wall of the tool body as in the embodiment of FIGURES 1 through 3, particularly in tools of lesser diameter. As shown particularly in FIGURES 6 and 7, the affixing member 32 is affixed to the tool body 20 by forming a fitted niche 80 in the tool body at the circumferentially spaced position. The affixing member 32 is then fixed into the niche by welding at 81. Referring particularly to FIGURE 5, reverse circulation intake tubes or nozzles are provided with the reverse circulation intake tube entrance positioned just behind the cutter and just above, for example two inches above, the level of the shoulder being cut. The intake faces of the juncture of the intersection of the cutter and the shoulder being cut. That is, in this embodiment the fluid nozzles 82 are so designed that they follow the path of the cutter and cuttings resulting from the rotation of the cutter are taken into the nozzle and drawn into the longitudinal opening 25 of the tool body. In order for this to occur, it has been found that the fluid openings or paths 83 can be varied and located such that they are directed to the proximity of the cutters just behind the cutters with respect to the direction of rotation of the cutters. The jets 82 are so constructed that their inside diameter decreases outwardly.

Thus, a particle which enters the nozzle will not be jammed therein since the diameter of the opening through which it passes continually increases. The nozzle intake 84 in the embodiment shown is shaped in the form of a slot which slot is directed downward at an angle and toward the cutter. The angle, of course, may be varied by partial rotation of the nozzle 82. The end of the nozzle and thus the slot opening 84 terminates, in the present embodiment, about one inch short of the outside of the hole being opened and one inch to two inches above the surface being cut by the cutters. The nozzle may be formed of any substance which is effectively resistant to abrasion and fracture in the drilling operation. Thus, in reverse circulation use of the hole enlarger of the present invention, the drilling fluid moves downward in the annular space between the drill string and the hole and up through the drill string, kelly, swivel hose, standpipe and into the sump. Since the fluid is moving upward through the longitudinal opening 25 at great speed it acts as a jet and causes a suction to be created through the fluid nozzles 82 in order to pull into the nozzles any particles which are dislodged by the cutters. The particles or cuttings then move through the nozzle and into the fluid path 25 and thence upward through the drill string. As discussed hereinbefore, the location of the intake slot 84 of the nozzles 82 can be varied by varying the length and configuration of the nozzles. The fluid velocity through the nozzles can also be varied by changing the diameters thereof. In the embodiment shown in FIGURES 5, 6 and 7 the nozzles are positioned behind the cutters by offsetting the fluid openings 83 from the radial plane of the respective cutter. The fluid paths 83 are again female threaded and mateable with the male threads of the nozzle. In this embodiment, as shown in FIGURE 5, the nozzle is curved and formed to an oblong slot 84 at the outer end thereof. The nozzle is mate threaded at the inner end for threaded connection into the fluid opening 83.

As discussed hereinbefore, the diameter to which the hole enlarger of the present invention will cut is varied by interchanging cutter assemblies upon the affixing members 32. To cut a larger diameter a cutter assembly 40 having a longer shaft 46 length is attached as shown in FIGURE 6. To cut a hole of lesser diameter an assembly having a shorter shaft 46 is used.

Thus, the present invention provides an improved hole enlarger which can be varied for different cutting diameters easily and quickly in the field without cutting or welding the tool.

What is claimed is:

1. A rotary earth boring hole enlarger for increasing the diameter of a well bore from the diameter of a pilot hole to a predetermined diameter comprising: an elongate tool body having relatively an upper end and a lower end adapted to be connected at the upper end thereof to a drill string, said elongate body defining a longitudinal fluid opening therethrough, a guide means affixed to said tool body proximate the lower end thereof, said guide means being adapted to position said body concentrically within said pilot hole, a plurality of cutter assembly affixing members affixed to said body above said guide means, said members extending radially outward from said body and spaced at circumferential intervals, said members being threaded at the radially outer end thereof, a plurality of cutter assemblies each removably affixed to a respective one of said members, said cutter assemblies including a radially extending shaft, said shaft being mateably threaded at the inner end thereof for threaded engagement with said respective member, and a cutter element rotatably affixed to said shaft, said cutter element having a cutting surface extending from the diameter of said pilot hole to said predetermined diameter, said tool body defining a plurality of fluid openings extending radially through said body to said longitudinal opening therethrough, each of said openings being positioned above a respective one of said affixing members, and a fluid nozzle positioned within each of said fluid openings coextensive therewith, each of said nozzles being directed radially outwardly and downwardly with an open outer end thereof positioned behind a respective one of said cutters relative to the direction of rotation of said tool body and cutter.

2. A rotary earth boring hole enlarger for increasing the diameter of a well bore from the diameter of a pilot hole to a predetermined diameter comprising: an elongate tool body having relatively an upper end and a lower end adapted to be connected at the upper end thereof to a drill string, said elongate body defining a longitudinal fluid opening therethrough, a guide means affixed to said tool body proximate the lower end thereof, said guide means being adapted to position said body concentrically within said pilot hole, a plurality of cutter assembly affixing members affixed to said body above said guide means, said members extending radially outward from said body and spaced at circumferential intervals, a cutter element rotatably affixed to each of said members, said cutter element having a cutting surface extending from the diameter of said pilot hole to said predetermined diameter, said tool body defining a plurality of fluid openings extending radially through said body to said longitudinal opening therethrough, each of said openings being positioned above a respective one of said affixing members, and a fluid nozzle positioned within each of said fluid openings coextensive therewith, each of said nozzles being directed radially outwardly and downwardly with an open outer end thereof positioned behind a respective one of said cutters relative to the direction of rotation of said tool body and cutter.

3. A rotary earth boring hole enlarger for increasing the diameter of a well bore from the diameter of a pilot hole to a predetermined diameter comprising: an elongate tool body having relatively an upper end and a lower end adapted to be connected at the upper end thereof to a drill string, said elongate body defining a longitudinal fluid opening therethrough, a guide means affixed to said tool body proximate the lower end thereof, said guide means being adapted to position said body concentrically within said pilot hole, a plurality of cutter assembly affixing members affixed to said body above said guide means, said members extending radially outward from said body and spaced at circumferential intervals, a plurality of cutter assemblies each removably affixed to a respective one of said members, said cutter assemblies including a radially extending shaft, said shaft being affixed at the inner end thereof to said respective member, and a cutter element rotatably affixed to said shaft, said cutter element having a cutting surface extending from the diameter of said pilot hole to said predetermined diameter, said tool body defining a plurality of fluid openings extending radially through said body to said longitudinal opening therethrough, each of said openings being positioned above a respective one of said affixing members, and a fluid nozzle positioned within each of said fluid openings coextensive therewith, each of said nozzles being directed radially outwardly and downwardly with an open outer end thereof positioned behind a respective one of said cutters relative to the direction of rotation of said tool body and cutter.

4. A rotary earth boring hole enlarger for increasing the diameter of a well bore from the diameter of a pilot hole to a predetermined diameter comprising: an elongate tool body having relatively an upper end and a lower end adapted to be connected at the upper end thereof to a drill string, said elongate body defining a longitudinal fluid opening therethrough, a guide means affixed to said tool body proximate the lower end thereof, said guide means being adapted to position said body concentrically within said pilot hole, a plurality of cutter assembly affixing members affixed to said body above said guide means, said members extending radially outward from said body and spaced at circumferential intervals, said members being threaded at the radially outer end thereof, a plurality of cutter assemblies each removably affixed to a respective one of said members, said cutter assemblies including a radially extending shaft, said shaft being mateably threaded at the inner end thereof for threaded engagement with said respective member, and a cutter element rotatably affixed to said shaft, said cutter element having a cutting surface extending from the diameter of said pilot hole to said predetermined diameter, said tool body defining a plurality of fluid openings extending radially through said body to said longitudinal opening therethrough, each of said openings being positioned above a respective one of said affixing members, and a fluid nozzle positioned within each of said fluid openings coextensive therewith, each of said nozzles being directed radially outwardly and downwardly with an open outer end thereof positioned behind a respective one of said cutters relative to the direction of rotation of said tool body and cutter, each of said nozzles being of increasing internal cross-sectional configuration extending inward from said open end.

References Cited in the file of this patent

UNITED STATES PATENTS

| | | |
|---|---|---|
| 1,733,311 | McNeill | Oct. 29, 1929 |
| 1,909,925 | Abegg | May 23, 1933 |
| 2,103,583 | Howard et al. | Dec. 28, 1937 |
| 2,104,823 | Sherman | Jan. 11, 1938 |
| 2,201,570 | Zublin | May 21, 1940 |
| 2,203,998 | O'Grady | June 11, 1940 |
| 2,238,998 | Grant | Apr. 22, 1941 |